| United States Patent [19] | [11] 3,719,589 |
|---|---|
| Herbstman et al. | [45] March 6, 1973 |

[54] ASPHALT SEPARATION IN DESULFURIZATION WITH AN OXIDATION STEP

[75] Inventors: Sheldon Herbstman, Spring Valley; Reese A. Peck, Fishkill; Frank E. Guptill, Jr., Fishkill; Raymond F. Wilson, Fishkill, all of N.Y.

[73] Assignee: Texaco Inc., New York, N.Y.

[22] Filed: March 5, 1971

[21] Appl. No.: 121,585

[52] U.S. Cl....................208/208 R, 208/4, 208/211, 208/251 R, 208/222, 208/240
[51] Int. Cl.....C10g 17/00, C10g 23/00, C10g 27/00
[58] Field of Search......208/211, 208, 251 R, 39, 40, 208/4, 6, 3, 237, 240, 222

[56] References Cited

UNITED STATES PATENTS

| 3,341,448 | 9/1967 | Ford et al. ..........................208/208 R |
| 3,284,342 | 11/1966 | Nathan et al. .....................208/208 R |
| 3,163,593 | 12/1964 | Webster et al. .......................208/219 |
| 3,565,793 | 2/1971 | Herbstman et al................208/208 R |
| 2,682,494 | 6/1954 | Weikart......................................208/3 |
| 2,809,153 | 5/1957 | Bacsik et al. ..............................208/6 |
| 3,551,328 | 12/1970 | Cole et al. .............................208/240 |

Primary Examiner—Delbert E. Gantz
Assistant Examiner—G. J. Crasanakis
Attorney—Thomas H. Whaley, Carl G. Ries and Robert Knox, Jr.

[57] ABSTRACT

Oil containing sulfur and asphalt is subjected to oxidation with organic peroxides or organic peracids at 75° – 200° F. The oxidant residue is removed by heating the oxidized product to about 150° – 450° F, and the heated oil is maintained at 300° – 500° F to separate a lower asphalt layer and to separate the upper oil layer having a reduced sulfur content. The separated oil layer may undergo further desulfurization by thermal treatment at 500° – 900° F or catalytic hydrotreatment at 650° – 900° F.

17 Claims, No Drawings

ASPHALT SEPARATION IN DESULFURIZATION WITH AN OXIDATION STEP

This invention relates to the desulfurization of a hydrocarbon material and more particularly to the desulfurization of hydrocarbon materials of petroleum origin and in particular residue-containing petroleum fractions of higher molecular weight.

Numerous processes have been suggested either to eliminate undesirable sulfur compounds or to convert them into more innocuous forms. One type of process involves physical extraction with a liquid such as sulfuric acid, sulfur dioxide or furfural. Another type of process removes the sulfur compounds by adsorption on suitable materials, for example activated bauxite, activated charcoal or an activated clay. A further type of process converts objectionable forms of sulfur compounds, such as mercaptans, into less harmful forms, such as disulfides and polysulfides by various chemical treatments, for example plumbite treatments, hydrochlorite treatments and copper chloride treatments. The above processes are particularly useful for the treatment of gasoline fractions but are not satisfactory for use with heavy residue-containing materials.

In addition to the above methods for the desulfurization of a hydrocarbon material, desulfurization of hydrocarbon materials has been attempted utilizing oxidation with oxygen as an oxidant followed by thermal treatment to remove sulfur from the oxidized material. The problem that arises utilizing the prior art methods is that heavy hydrocarbon materials such as vacuum residues contain sulfur in the form of thiophene sulfur which type of sulfur is particularly difficult to remove from such hydrocarbon material. In addition, the air oxidation of a sulfur containing hydrocarbon material is not selective towards sulfur oxidation of the hydrocarbon materials, and the formation of ketones and acids occurs. A particular problem that can occur utilizing an oxidation step is the necessity of obtaining a catalyst which will promote the effectiveness of an oxidant while not substantially affecting adversely the overall product quality of the hydrocarbon material. Thus, certain catalysts promote non-selective oxidation or give relatively little increase in oxidation rates when combined with an oxidant.

Another prior art method is catalytic hydrodesulfurization. However, because of the metals and asphalt present in residue-containing fractions which tend to cause rapid deactivation of the catalyst, catalytic hydrodesulfurization of residual stocks is unattractive because of the expense incurred in frequent regeneration and replacement of the catalyst.

It has now been found that desulfurization of a hydrocarbon material can be accomplished by contacting a sulfur and residue containing hydrocarbon material with an oxidant selected from the group consisting of an organic hydroperoxide, an organic peroxide, an organic peracid and mixtures thereof, removing the asphalt and therewith agglomerated metal compounds and subjecting the deasphalted oil to catalytic hydrodesulfurization. The separated asphalt may then be combined with the desulfurized oil.

Typical examples of hydrocarbon oils which are particularly adaptable to the process of this invention are those petroleum fractions containing at least a major amount of material boiling above 550° F. for example, crude oil and atmospheric and vacuum residues which contain usually 1 percent by weight or more of sulfur. Additional examples of hydrocarbon oils to which the present invention may be usefully applied are, residual fuel oils, topped or reduced crudes, crude petroleum from which the lighter fractions are absent, vacuum residues, residues from cracking processes, oils from tar sands and oil shale. The invention is especially applicable to such of these and other like materials as cannot be deeply flashed without extensive carry over of sulfur containing compounds. In general the thiophene containing materials which are found in the hydrocarbon oils which are extremely difficult to remove are by way of example tetraphenylthiophene, diacenaphtho [1,2-b,1', 2'-d] thiophene and anthra [2,1,9-cde] thianaphthene.

The oxidants which are utilized in carrying out the process of this invention are selected from organic peroxides, organic hydroperoxides and organic peracids. These oxidants include by way of example hydrocarbon peroxides, hydrocarbon hydroperoxides and hydrocarbon peracids wherein the hydrocarbon radicals in general contain from about one to about 30 carbon atoms per peroxide linkage. With respect to the hydrocarbon peroxides and hydrocarbon hydroperoxides, it is particularly preferred that such hydrocarbon radical contain from four to 18 carbon atoms per peroxide linkage and more particularly from four to 16 carbon atoms per peroxide linkage. With respect to the hydrocarbon peracids the hydrocarbon radical is defined as that radical which is attached to the carbonyl carbon and in general such hydrocarbon radical can be from one to about 12 carbon atoms more preferably from about one to about 8 carbon atoms. It is intended that the term organic peracid includes by way of definition performic acid wherein hydrogen is attached to the carbonyl carbon. Preferred embodiments of this invention are the use of organic hydroperoxides and organic peroxides in combination with a metal containing catalyst or an organic peracid in the absence of an added oxidation catalyst. Thus it has been found that the organic hydroperoxides and peroxides are promoted selectively in combination with these metal catalysts. Preferred oxidants are the organic hydroperoxides such as tertiary butyl hydroperoxide and cumene hydroperoxide and organic peracids such as peracetic acid.

In addition it is contemplated within the scope of this invention that the organic oxidants can be prepared in situ, that is the peroxide, hydroperoxide or peracid can be generated in the sulfur containing heavy hydrocarbon fraction and such organic oxidant is contemplated for use within the scope of this invention.

Typical examples of oxidants are hydroxyheptyl peroxide, cyclohexanone peroxide, t-butyl peracetate, di-t-butyl diperphthalate, t-butyl-perbenzoate, methyl, ethyl ketone peroxide, dicumyl peroxide, t-butyl hydroperoxide, di-t-butyl peroxide, p-menthane hydroperoxide, pinane hydroperoxide, 2,5-dimethylhexane-2,5-dihydroperoxide and cumene hydroperoxide, organic peracids, such as performic acid, peracetic acid, trichloroperacetic acid, perbenzoic acid and perphthalic acid.

The catalyst which is utilized to promote the oxidation using peroxide oxidants are selected from Group IVB, Group VB, Group VIB and iron group metals. The catalyst can be incorporated into the oxidation system by any means known to those skilled in the art, and can be either a homogeneous or heterogeneous catalyst system. The catalyst can be incorporated by a variety of means and by the use of a variety of carriers. The particular catalyst carrier which is utilized is not critical with respect to the practice of this invention and can be for example, a support medium or an anion (including complex formation) which is attached to the metal (e.g., a ligand). The particularly preferred catalyst metals are titanium, zirconium, vanadium, tantalum, chromium, molybdenum, cobalt and tungsten. Illustrative ligands include halides, organic acids, alcoholates, mercaptides, sulfonates and phenolates. These metals may be also bound by a variety of complexing agents including acetyl acetonates, amines, ammonia, carbon monoxide and olefins, amongst others. The metals may also be introduced in the form of organo-metallics including "ferrocene" type structures. The various ligands illustrated above which are utilized as carriers to incorporate the metal into the process system, in general have an organic radical attached to a functional group such as the oxygen atom of carbonyloxy group of the acid, the oxygen of the alcohol, the sulfur of the mercaptan, the

of the sulfonate, the oxygen of the phenolic compound and the nitrogen of the amines. The organic radical attached to the aforedescribed functional groups can be defined as a hydrocarbon radical and in general can contain from one to about 30 carbon atoms. Preferably the catalyst system is homogeneous with catalysts such as molybdenum hexacarbonyl, vanadium acetyl acetonate, cobalt octanoate, cobalt naphthenate and the like being preferred. As pointed out above, no catalyst is used when the oxidant is a peracid.

The present invention also contemplates the in situ production of the peracid. For example, peracetic acid may be formed in situ by the reaction of acetaldehyde and oxygen. Similarly, for example, propionaldehyde and phenylacetaldehyde may be used in the preparation of the corresponding peracids.

The oxidant should be present in an amount to provide at least one mole of "peroxy" oxygen per mole of sulfur, preferably from about 1 to 5 moles of "peroxy" oxygen per mole of sulfur. The oxidation is effected at a temperature between about 70° and 250° F. preferably between 80° and 150° F.

After oxidation, the oxidized oil is advantageously treated to remove the oxidant residue such as the corresponding acid when the oxidant is a peracid. This may be effected by heating the oxidized oil, e.g., to 150°–450° F. under atmospheric or reduced pressure. The oxidant residue may be sold commercially or may be used to make additional oxidant as for example reduction of the acid to the aldehyde with subsequent oxidation of the aldehyde to the peracid.

The oxidized oil is then transferred to a settling vessel maintained at a temperature between about 300°–500° F., preferably 350°–450° F. from which the deasphalted oil may be withdrawn as an upper layer and asphalt and metal containing compounds may be withdrawn as a lower layer.

The deasphalted oil is then subjected to a desulfurization treatment such as a thermal desulfurization or a hydrocatalytic desulfurization.

In the thermal treatment step, sulfur reduction is accomplished by treating the oxidized deasphalted oil at temperatures above 300° F., preferably above 500° F. and particularly in the temperature range of from about 550° F. to about 900° F. for a period sufficient to ensure that substantially all the sulfur gaseous decomposition products are removed. This period in general is within the range of about ½ to 10 hours, preferably between about ½ and 5 hours. Under these conditions, the oxidized sulfur compounds are decomposed and the sulfur is liberated mainly as $SO_2$ although at higher temperatures in the region of 550° F. and over, increasing quantities of $H_2S$ are also liberated. The thermal decomposition step may be carried out in the presence of suitable promoting materials comprising porous solids having acidic or basic properties for example, ferric oxide on alumina, bauxite, thoria on pumice, silica alumina, soda-lime and acid sodium phosphate on carbon. Preferably, in the thermal, decomposition step, a small quantity of an inert carrier gas, for example nitrogen, is passed through the reaction mixture to avoid local overheating and also to remove the gaseous sulfur decomposition products.

The catalytic hydrodesulfurization stage may be carried out under relatively mild conditions in a fixed, moving, fluidized or ebullating bed of catalyst. Preferably a fixed bed of catalyst is used under conditions such that relatively long periods elapse before regeneration becomes necessary, for example a temperature within the range of from about 500° to about 900° F. preferably from about 650° to about 800° F., and at a pressure within the range of from about 100 to about 2,300 p.s.i.g.

A particularly preferred pressure range within which the hydrodesulfurization step provides extremely good sulfur removal while minimizing the amount of pressure and hydrogen required for the hydrodesulfurization step are pressures within the range of 300 to 800 p.s.i.g. more preferably from about 400 to 600 p.s.i.g.

The hydrogen used in the catalytic hydrodesulfurization need not be pure, satisfactory results having been obtained with hydrogen having a purity of about 60 percent. Preferably, however the hydrogen has a purity of about 70–95 percent. Suitable sources of hydrogen are catalytic reformer by-product hydrogen, electrolytic hydrogen and hydrogen produced by the partial oxidation of hydrocarbonaceous materials followed by shift conversion and $CO_2$ removal. Hydrogen may be introduced into the desulfurization reactor at a rate of between about 500 and 20,000 standard cubic feet per barrel (SCFB) of oxidized deasphalted oil charge preferably from about 1,000 to 5,000 SCFB.

The catalysts used in the process of our invention comprise a Group 8 metal compound such as the oxide or sulfide of cobalt, iron or nickel or mixtures thereof advantageously used in conjunction with a Group 6 metal compound such as the oxide or sulfide of molybdenum or tungsten. Ordinarily, the catalyst is charged to the reactor in oxide form although it can be expected that some reduction and some sulfidation takes place during the course of the process so that after being on stream for some time the catalyst is probably a mixture of the metal, the metal sulfide and perhaps the oxide. The Group 8 metal compound may be present in an amount carrying from 1 to 20 percent by weight of the catalyst composite. The Group 6 metal compound may be present in an amount ranging from about 5 to 40 percent of the total catalyst composite. Ordinarily, the hydrogenating components are supported on a refractory inorganic oxide such as alumina, zirconia, silica or magnesia or mixtures thereof. Particularly suitable catalysts comprise nickel and tungsten, cobalt and molybdenum or nickel and molybdenum on a refractory support. If desired the catalyst may be sulfided prior to use e.g., by contact with a hydrogen stream containing up to about 10 volume percent $H_2S$ OR $CS_2$ at a temperature between about 400° and 900° F.

The following examples are submitted for illustrative purposes only.

EXAMPLE I

In this example the charge stock is a 550° F.+ Reduced Arabian crude having the following characteristics:

| | |
|---|---|
| Gravity, °API | 21.2 |
| Sulfur, wt. % | 2.7 |
| Conradson Carbon Residue, wt. % | 5.5 |
| Vanadium, ppm | 17 |
| Nickel, ppm | 6 |
| Distillation, wt. % | |
| 550°–650°F. | 20.7 |
| 650°F.+ | 79.3 |

To 24 parts by weight of the charge stock, 8.4 parts by weight of 40 percent peracetic acid are added with vigorous agitation at an average temperature of 114° F. over a 6 hour period. After several hours of continued stirring, the reaction mixture is stripped at 250° F. and 26–31 mm Hg for 12 hours for the removal of light ends, primarily acetic acid. After settling, the stripped product is separated into a deasphalted oil and asphalt.

EXAMPLE II

In this example variations are made in the oxidant with thermal desulfurization of the deasphalted oil at 750° F. for 4 hours.

| Run No. | Charge | 1 | 2 | 3 | 4 |
|---|---|---|---|---|---|
| Oxidant | | peracetic acid | peracetic acid | peracetic acid | acetic acid & oxygen |
| O/S[1] mole ratio | | 1.9 | 0.95 | 0.49 | 4.0[2] |
| Asphalt, wt. % | | 12 | .5 | 0 | 0 |
| Sulfur, wt. % | 2.7 | 1.7 | 2.2 | 2.7 | 2.7 |
| N, wt. % | 0.14 | 0.06 | 0.10 | 0.12 | 0.13 |

[1] peroxy oxygen: sulfur
[2] In excess of 4 moles oxygen per mole sulfur

| Asphalt Fraction | | | | | |
|---|---|---|---|---|---|
| S, wt. % | | 2.5 | 3.0 | | |
| N, wt. % | | 0.14 | - | | |
| V, ppm | | 5 | 34 | | |
| Ni, ppm | | 17 | 22 | | |
| Thermally Treated Oil | | | | | |
| S, wt. % | | 0.54 | 1.7 | 2.2 | 2.2 |
| N, wt. % | | 0.05 | 0.053 | 0.07 | 0.07 |
| % Desulfurization | | 68 | 37 | 18 | 18 |
| % Denitrogenation | | 62 | 53 | 50 | |

These data show that acetic acid + oxygen is unsatisfactory as an oxidant and also show that a minimum mole ratio of O:S of at least about 1 is necessary to obtain a product deasphalted oil which can be effectively desulfurized thermally over silica-alumina.

EXAMPLE III

This example shows comparative analytical data of products obtained by catalytic hydrodesulfurization of the charge stock of Example I and the catalytic hydrodesulfurization of the stripped deasphalted oil obtained by oxidation of the charge using peracetic acid at a mole ratio O:S of 2. Desulfurization conditions are a temperature of 700° F., a pressure of 500 psig, a liquid hourly space velocity of 1 and a hydrogen rate of 12,000 standard cubic feet per barrel of charge. The catalyst is a nickel (4 percent), molybdenum (11 percent) on silica stabilized alumina desulfurization catalyst. Sample 1 is the untreated charge stock of Example I, Sample 2 is the product obtained by the catalytic hydrodesulfurization of the charge stock of Example I, Sample 3 is the deasphalted oil obtained by oxidation (using a 2 mole ratio) of the charge stock of Example 1 and Sample 4 is the product obtained by the desulfurization of sample 3.

| Sample | 1 | 2 | 3 | 4 |
|---|---|---|---|---|
| Sulfur, wt. % | 2.7 | 1.3 | 2.0 | 0.85 |
| Nitrogen, Wt. % | 0.14 | 0.11 | 0.07 | 0.07 |
| Carbon residue, wt. % | 5.5 | 4.17 | 4.79 | 2.92 |
| Gravity, °API | 21.2 | 24.3 | 21.8 | 25.8 |
| % desulfurization | | 52 | | 57.0 |
| % denitrogenation | | 21 | | 0 |

These data show that not only does the oxidation step produce a slight reduction in sulfur content but also that the deasphalted oxidized oil is more susceptible to desulfurization.

EXAMPLE IV

In this example the 500° F+ Reduced Arabian Crude charge stock of Example 1 is oxidized at 120° F. using 40 lb. peracetic acid per barrel of charge. After stripping the oxidant residue the oil is transferred to a settling drum maintained at 325° F. from which an upper layer of deasphalted oil and a lower layer (12 percent of charge) are removed. Thermal treatment of the deasphalted oil is effected at 750° F. for 4 hours over 10 weight percent silica-alumina pellets (75 percent $SiO_2$, 25 percent $Al_2O_3$). Yield of desulfurized oil is 89 volume percent with a sulfur content of 0.4 wt. percent, nitrogen of 0.03 wt. percent and vanadium 3 ppm. When recombined with the asphalt fraction, the over-all yield is 90 volume percent of an oil containing 0.66 percent S and 0.05 percent N. Over-all desulfurization is 76 percent and denitrification 78 percent.

We claim:

1. A process for the production of oil of reduced sulfur content which comprises subjecting a hydrocarbon oil containing sulfur and asphalt to oxidation with an oxidant selected from the group consisting of organic peroxides and organic peracids at a temperature between about 75° and 200° F., removing the oxidant residue by heating the oxidation product to a temperature between about 150° and 450° F. maintaining the heated oil in a settling zone at a temperature between about 300° and 500° F. to produce an upper layer of oil of reduced sulfur content and a lower layer comprising asphalt and separating the layers.

2. The process of claim 1 in which the oxidant is an organic peroxide.

3. The process of claim 1 in which the oxidant is an organic peracid.

4. The process of claim 3 in which the oxidant is peracetic acid.

5. The process of claim 3 in which the peracid is prepared in situ.

6. The process of claim 1 in which the separated upper layer is heated to a temperature between 500° and 900° F. to effect additional desulfurization.

7. The process of claim 6 in which the separated upper layer is contacted with silica-alumina at a temperature between 550° and 900° F.

8. The process of claim 6 in which the separated upper layer is contacted with a catalyst comprising a Group VI metal and a Group VIII metal or compounds thereof supported on a refractory inorganic oxide at a temperature between 650° and 900° F. in the presence of added hydrogen.

9. The process of claim 1 in which the molar ratio of peroxy oxygen in the oxidant to sulfur in the hydrocarbon oil charge material is not less than about 1.

10. The process of claim 2 in which the oxidation is carried out in the presence of a catalyst.

11. The process of claim 10 in which the oxidation is carried out in a homogeneous catalyst system.

12. The process of claim 11 in which the catalyst comprises molybdenum hexacarbonyl.

13. The process of claim 11 in which the catalyst comprises vanadium acetyl acetonate.

14. The process of claim 11 in which the catalyst comprises cobalt octanoate.

15. The process of claim 11 in which the catalyst comprises cobalt naphthenate.

16. The process of claim 5 in which the peracid is prepared by the reaction of oxygen and the corresponding aldehyde.

17. The process of claim 9 in which the mole ratio is between about 1 and 5.

* * * * *